United States Patent
Kuhn

[11] 3,872,611
[45] Mar. 25, 1975

[54] WRITING GUIDE FOR TRAINING PURPOSES AND USE BY THE BLIND

[76] Inventor: Henry S. Kuhn, 609 Austin Ave., Park Ridge, Ill. 60068

[22] Filed: Apr. 4, 1974

[21] Appl. No.: 457,826

[52] U.S. Cl. .................................................. 35/38
[51] Int. Cl. ........................................... G09b 21/00
[58] Field of Search ............... 35/38, 7 A; 116/119; 40/352, 357

[56] References Cited
UNITED STATES PATENTS

| | | | |
|---|---|---|---|
| 2,530,437 | 11/1950 | Marks | 35/38 |
| 3,238,643 | 3/1966 | O'Connor | 35/7 A X |
| 3,353,284 | 11/1967 | Hursh et al. | 35/7 A X |
| 3,579,867 | 5/1971 | Kuhn | 35/38 |

*Primary Examiner*—Wm. H. Grieb
*Attorney, Agent, or Firm*—Hill, Gross, Simpson, Van Santen, Steadman, Chiara & Simpson

[57] ABSTRACT

An improvement in writing guides for training purposes and use by the blind, employing a generally planar structure, the upper face of which forms the surface on which may be disposed the paper sheet to be written on, the structure having a series of parallel abutments extending horizontally across at least a portion of the upper face of the board operative to impart a distinct resistance to movement of a ball-point pen, or other writing instrument, applied to such a paper sheet, in a downward direction below such writing line, in which the structure includes paramagnetic means disposed at or adjacent to the upper face of the structure and a line marker having at least a part thereof forming paramagnetic means cooperable with the paramagnetic means of the guide structure, at least one such means being magnetized to provide attraction between the two paramagnetic means for retaining the marker in a selected position on the face of the structure to provide an indication of a desired writing line.

10 Claims, 4 Drawing Figures

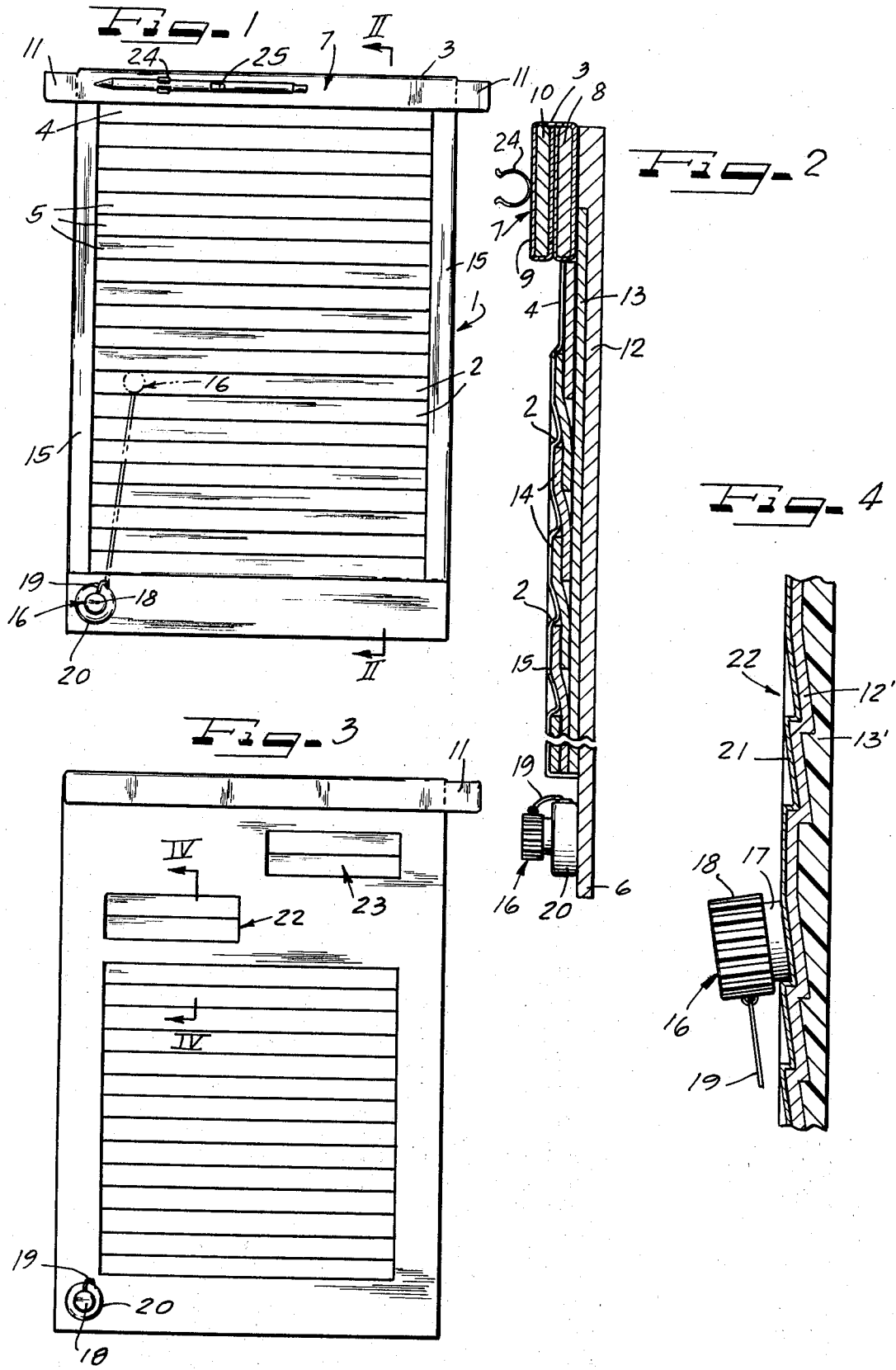

3,872,611

WRITING GUIDE FOR TRAINING PURPOSES AND USE BY THE BLIND

BACKGROUND OF THE INVENTION

The present invention is directed to an improvement in a writing guide or the like, particularly as a writing aid for blind persons as well as those who, for other reasons, have difficulty in writing on a straight line, and is an improvement in the guide structure illustrated in my prior U.S. Pat. No. 3,579,867, granted on May 25, 1971.

In using a board of this type, it is often difficult for the blind or handicap to indicate a selected writing line, for example to indicate the end of previous writing, and enable determination of the line at which a subsequent writing is to be started.

The present invention thus is directed to an improved writing structure of the type described having very simple and easily operated means for designating a selected line on the board.

BRIEF SUMMARY OF THE INVENTION

The invention is directed to an improved guide structure of the type referred to, having the upper surface thereof formed with a series of edges providing abutments facing the upper or top edge of the board whereby such abutments will create or impart a resistance to a pen or pencil writing upon a sheet disposed on the board, as the point of such writing instrument reaches the vicinity of such abutment, the amount of resistance depending upon the pressure exerted by the point of the writing instrument on the writing paper.

The invention is particularly directed to novel means for marking the location of the line actually being employed for writing, or to be subsequently employed, which may, for example, comprise a suitable member which may be disposed on any designated line and retained thereat by magnetic attraction, and when not in use is disposed out of the way whereby it will not interfere with the normal use of the board. At the same time, the construction is such that the marker cannot be lost or misplaced.

Novel means is also provided to insure accurate positioning and retention of the writing paper on the structure during the writing operation, the structure being provided with magnetically actuated paper retention means disposed at the top of the structure under which the paper may be easily disposed and firmly retained in operative position for writing thereon.

BRIEF DESCRIPTION OF THE DRAWINGS

In the drawings, wherein like reference parts indicate like or corresponding parts:

FIG. 1 is a plan view of a writing guide constructed in accordance with the present invention;

FIG. 2 is a longitudinal sectional view taken approximately on the line II—II of FIG. 1;

FIG. 3 is a plan view similar to FIG. 1 illustrating in modified form the invention; and FIG. 4 is a transverse sectional view taken approximately on the line IV—IV of FIG. 3.

DETAILED DESCRIPTION OF THE INVENTION

Referring to FIGS. 1 and 2, the reference numeral 1 indicates a generally planar structure having sufficient rigidity to permit its use as a supporting member for a paper sheet or other writing material, and as illustrated in FIG. 2, the upper face of the structure is provided with a plurality of parallel edges 2, which in the embodiment illustrated extend horizontally across the structure and at substantially right angles to the general plane thereof, forming abutments which face toward the top or upper edge 3 of the structure, with the upper horizontally extending face 4 adjacent such top edge and the lower horizontal portion 6 of the structure being generally flat. As will be apparent from FIG. 2 each adjacent pair of abutments 2 define therebetween an area 5 to receive a line of writing.

To facilitate retention of a sheet of paper in proper position upon the structure, the latter preferably is provided with paper retaining means in the form of a clamp structure, indicated generally by the numeral 7, comprising a stationary jaw member 8 constructed, for example, of sheet metal, if desired, suitably covered by sheet material 9, and cooperable with a movable jaw member 10 which is illustrated as being of greater length than the width of the structure 1 to provide a handle 11 at either or both ends of the member. As illustrated, the member 10 is suitably hinged to the member 8 along its upper edge by suitable means as for example the covering material 9, with such connected upper edge thus forming a limiting stop for the paper sheet when inserted under the jaw member 10.

The members 8 and 10 are both formed from paramagnetic material with at least one of them suitably magnetized whereby the magnetic forces will firmly retain a sheet of paper, clamped between the two members, in operative writing position. At the same time the paper may be readily released by upward movement on the handle 11 to separate the members.

The surfaces defining the area 5 between each adjacent pair of edges 2 are illustrated as being substantially flat and are each inclined upwardly toward the top edge 4 whereby each of the areas 5 extend from the inner boundary of the lowermost edge of an adjacent pair to the outer boundary of the uppermost edge of the other of such pair, whereby the construction resembles a clap board siding, in an inverted position i.e., the direction of inclination being reversed from top to bottom. Each of the abutments formed by the edges 2 are adapted to define a horizontal writing line with the area 5 directly thereabove to receive the writing. As explained in my previously referred to patent, when normal pressure is applied by a writing instrument such as a ball-point pen to a paper sheet disposed on the guide structure, the paper will tend to conform to the configuration of the upper surface of the structure at the specific writing area involved and as the writing implement is moved downwardly towards the adjacent abutment the latter will eventually offer a distinct resistance to further downward movement of the writing implement, thus imparting to the writer, solely by the sense of touch or feel, the information that the writing implement has reached the lower limit of the writing area. The proportions of the edges 2 and areas 5, as well as the inclination of the latter are such that a relatively flat, efficient writing surface is presented, which operatively is substantially conventional with the exception of the creation of the resistance previously mentioned. Likewise, the height of the abutments may be selected to provide the desired amount of resistance, without otherwise effecting the writing operation.

In a guide structure of the type here involved, it is desirable to provide suitable means for designating a particular writing line, for example to designate the last written line, whereby such line may be readily identified, for example at a later time when writing is to be resumed.

In the present invention, the guide structure is so constructed that the marking means likewise may employ magnetic attraction as the position-retaining means. Referring particularly to FIG. 2, disposed on the upper face of the base or backing member 12 is a sheet 13 of paramagnetic material, for example a ferro-sheet metal, on the top face of which is disposed a plurality of horizontally extending strips 14, the upper edges of which form the respective abutments 2 and, as illustrated, the strips 14 are each disposed with their upper portions overlapping the lower portions of the strip thereabove whereby the writing lines 5 are, for the purposes of writing, sufficiently flat and at the same time inclined slightly to provide the desired abutments. The strips 14 may, for example, have a width of three quarters of an inch with a quarter inch overlap to provide a writing line one half inch in height.

The strips 14 may be formed from any suitable material, which, in a preferred embodiment, comprise a so-called magnetic rubber material, which is flexible, providing a relatively soft or non-rigid writing surface which is particularly suitable for ball point pens and the like. The lower faces of the strips may be coated with a suitable adhesive, whereby they may be readily assembled in the desired relationship to form a unitary structure.

Edge margins may be suitably defined, for example, by adhesively retained strips 15 of suitable material applied to the edge portions of the respective strips 14, and adapted to impart a definite feel to the user, for example a blind person, whereby by the lattter can readily identify the edge margins.

The marking means 16, in the embodiment illustrated, for designating a writing line, comprises a magnet 17 mounted in a suitable holder 18 to which is connected one end of a retractable cord 19. The opposite end of the cord 19 is suitably attached to a retracting mechanism contained within a cord-retaining housing 20. Such cord-retracting mechanism may be of known construction whereby the cord normally is retained in the housing, but may be readily manually withdrawn by exerting pulling forces on the cord. The housing 20, as illustrated in the drawings, is mounted at the lower portion 6 of the guide structure, preferably at the lower left hand corner thereof, whereby the marker 16 will normally be retained in the positions illustrated in FIGS. 2 and 3 at the housing 20. However, by pulling the cord out of the housing the marker 16 may be disposed on any writing line and readily retained in operative position, not only by magnetic attraction, but also by physical engagement with the adjacent abutment 2 (as illustrated in FIG. 4), which opposes movement of the marker in cord-retracting direction.

The construction illustrated in FIGS. 3 and 4 employs a modified construction of guide structure, as well as a modified arrangement of the face thereof.

In this embodiment, the abutments 2 are formed by stamping or other suitable operation, on a piece of paramagnetic sheet material 13' which is suitably backed by a member 12' which, for example, may be of complementary configuration and adhesively or otherwise secured to the member 13'. The member 12', for example, may be of molded plastic or other material.

To provide a suitable writing surface, the sheet 13' is coated with a layer of plastic or other relatively resilient material, suitable for the purpose, which may, for example, be in the form of a sheet material applied or in the form of a suitably applied coating.

As in the construction of FIG. 4, the member 12' may be extended at the top and provided with a paper retaining clamp such as illustrated in FIGS. 1 and 2 and may be similarly extended at the bottom of the structure as indicated at 6, on which the housing 20 may be mounted.

The construction of FIG. 3 also illustrates the use of different, separated areas 22, 23 for specific writing purposes, enabling a blind person to accurately locate and identify different areas of the structure, for example, for use in letter writing, etc., as described in my previously referred to patent.

The marker 16 is simple to use by a blind person and when not in use may be magnetically attracted to the housing 20, if made of paramagnetic material, where it will be completely out of the writer's way, enabling full use of the writing guide without interference.

Likewise, the paper holder 7 is exceedingly simple to use and while firmly retaining a writing sheet in operative position is easily opened to release the same.

As illustrated in FIGS. 1 and 2, the clamping member 9 may be provided with pen retaining means, for example a clip member 24, so that the pen will always be readily available. Likewise, if desired the pen involved may include magnetic means 25 whereby it will readily be retained on any available paramagnetic surface of the structure.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A writing guide comprising a generally planar structure, the upper face of which forms the surface on which may be disposed a paper sheet to be written on, said structure having sufficient rigidity to permit its use as a supporting member of such a paper sheet during writing operations thereon, the upper face of said structure having a series of parallel edges, extending horizontally across at least the central portion of said structure and defining respective writing lines, each of such edges forming an abutment at the writing line defined thereby, disposed to impart a distinct resistance to movement of a writing instrument, applied to such a paper sheet, in a downward direction below such writing line, and a line-marker having a paper-engageable portion of a size to be operatively disposed on such a writing line, a retaining cord having one end operatively attached to said line marker and the other end to a cord retracting mechanism, including a housing carried by said guide structure at the bottom portion thereof, whereby said cord and retracting mechanism are operable to urge said marker, when the latter is disposed on such a paper sheet, in a direction toward the adjacent abutment, whereby the latter may oppose such retractive forces, and means on said marker and said guide structure providing a magnetic attraction and thus a retaining action therebetween.

2. A writing guide according to claim 1, wherein said writing lines are formed by a plurality of horizontally extending strips, each of which has its upper portion overlapping the lower portion of the adjacent strip thereabove.

3. A writing guide according to claim 2, wherein said strips are constructed of so-called magnetized rubber material, said marker being provided with a cooperable magnetic member.

4. A writing guide according to claim 3, wherein said magnetic strips are mounted on a paramagnetic sheet forming a part of said guide structure.

5. A writing guide according to claim 4, wherein said guide structure is provided with side margins defined by respective strips of material adhesively secured to the lateral end portions of said strips.

6. A writing guide according to claim 1, wherein said structure comprises a paramagnetic metallic member having a top surface configured to provide the desired writing lines and margins, the top face of said member being provided with a layer of relatively resilient material adapted to provide a suitable writing surface on said writing lines.

7. A writing guide according to claim 6, wherein said metallic member is reinforced with a backing member to which it is secured.

8. A writing guide according to claim 1, comprising in further combination, paper-retaining means disposed at the upper edge portion of said structure, said paper-retaining means comprising a horizontally extending clamping member fixedly carried by said guide structure, and a movable clamping member, means for hingedly connecting said movable member to the guide structure for cooperation with said fixed member whereby a sheet of paper may be clamped therebetween, and means for providing a magnetic attraction between said clamping members operatively to normally maintain the latter in paper-clamping relation.

9. A writing guide according to claim 8, wherein at least one end of said movable clamping member extends laterally outward beyond the adjacent side edge of the guide structure forming handle means for facilitating actuation of said movable member.

10. A writing guide according to claim 1, comprising in further combination, means adapted to be carried by said movable clamping member for detachably retaining a writing implement thereon.

* * * * *